(12) United States Patent
Bonnat

(10) Patent No.: US 10,216,259 B2
(45) Date of Patent: Feb. 26, 2019

(54) METHOD AND SYSTEM FOR PROCESSING SIGNALS THAT CONTROL A DEVICE USING HUMAN BREATH

(76) Inventor: Pierre Bonnat, Las Vegas, NV (US)

(*) Notice: Subject to any disclaimer, the term of this patent is extended or adjusted under 35 U.S.C. 154(b) by 1323 days.

(21) Appl. No.: 12/056,171

(22) Filed: Mar. 26, 2008

(65) Prior Publication Data

US 2009/0249202 A1 Oct. 1, 2009

Related U.S. Application Data

(63) Continuation-in-part of application No. 10/453,192, filed on Jun. 2, 2003, now Pat. No. 7,584,064, which is a continuation of application No. 09/913,398, filed as application No. PCT/FR00/00362 on Feb. 14, 2000, now Pat. No. 6,574,571.

(51) Int. Cl.
*G01F 1/00* (2006.01)
*G06F 3/01* (2006.01)

(52) U.S. Cl.
CPC .................... *G06F 3/011* (2013.01)

(58) Field of Classification Search
CPC .......... G01F 1/74; G01F 1/7082; G01F 1/002; G01F 1/66
USPC ......................................................... 702/48
See application file for complete search history.

(56) References Cited

U.S. PATENT DOCUMENTS 3,709,213 A * 1/1973 Yard ....................... G01F 1/203
600/538
4,207,959 A 6/1980 Youdin et al.
4,433,685 A 2/1984 Giorgini et al.
4,521,772 A 6/1985 Lyon
4,561,309 A 12/1985 Rosner
4,713,540 A 12/1987 Gilby et al.
(Continued)

FOREIGN PATENT DOCUMENTS

JP 06241883 A * 9/1994
JP 10320108 12/1998
(Continued)

OTHER PUBLICATIONS https://www.youtube.com/watch?v=NT2hXyVZ8bM, Omar Chouiekh, Nov. 15, 2007.*
(Continued)

*Primary Examiner* — Toan Le
*Assistant Examiner* — Xiuquin Sun
(74) *Attorney, Agent, or Firm* — McAndrews, Held & Malloy, Ltd.

(57) ABSTRACT

Certain aspects of a method and system for processing signals that control a device using human breath may include receiving at the device, one or more signals from a detection device operable to function as a human interface device (HID). The signals may be generated in response to detection of movement of air caused by expulsion of human breath. Human interfacing with a graphical user interface (GUI) of the device may be enabled via the received signals. The detection device may comprise a micro-electro-mechanical system (MEMS) detector. The received signals may be formatted into a HID profile. The HID profile may comprise one or more drivers and/or libraries that enables the interfacing with the GUI of the device. The drivers may enable one or more of initiation, establishment and/or termination of communication by the device.

51 Claims, 11 Drawing Sheets

(56) References Cited

U.S. PATENT DOCUMENTS

| | | |
|---|---|---|
| 4,746,913 A | 5/1988 | Volta |
| 4,929,826 A | 5/1990 | Truchsess et al. |
| 5,226,416 A * | 7/1993 | Bethune et al. ............ 600/310 |
| 5,341,133 A | 8/1994 | Savoy et al. |
| 5,378,850 A | 1/1995 | Tumura |
| 5,422,640 A | 6/1995 | Haley |
| 5,603,065 A * | 2/1997 | Baneth .......................... 710/73 |
| 5,740,801 A | 4/1998 | Branson |
| 5,763,792 A | 6/1998 | Kullik |
| 5,835,077 A | 11/1998 | Dao |
| 5,889,511 A | 3/1999 | Ong |
| 5,907,318 A | 5/1999 | Medina |
| 6,040,821 A | 3/2000 | Franz |
| 6,085,265 A * | 7/2000 | Kou ............................... 710/63 |
| 6,213,955 B1 | 4/2001 | Karakasoglu et al. |
| 6,261,238 B1 | 7/2001 | Gavriely |
| 6,263,392 B1 * | 7/2001 | McCauley ............ G06F 9/4411 463/25 |
| 6,323,846 B1 | 11/2001 | Westerman |
| 6,396,402 B1 | 5/2002 | Berger et al. |
| 6,421,617 B2 | 7/2002 | Felsenstein |
| 6,516,671 B2 | 2/2003 | Romo et al. |
| 6,574,571 B1 * | 6/2003 | Bonnat ............................ 702/48 |
| 6,664,786 B2 | 12/2003 | Kretschmann |
| 7,038,665 B1 * | 5/2006 | Pandana ...................... 345/168 |
| 7,053,456 B2 | 5/2006 | Matsuo |
| 7,346,178 B2 * | 3/2008 | Zhe ..................... H04R 31/003 381/174 |
| 2002/0132704 A1 * | 9/2002 | Levine ............................ 482/13 |
| 2003/0208334 A1 | 11/2003 | Bonnat |
| 2004/0017351 A1 * | 1/2004 | Bonnat ................. G06F 3/011 345/156 |
| 2005/0127154 A1 | 6/2005 | Bonnat |
| 2005/0268247 A1 | 12/2005 | Baneth |
| 2006/0118115 A1 | 6/2006 | Cannon |
| 2006/0142957 A1 | 6/2006 | Bonnat |
| 2007/0048181 A1 | 3/2007 | Cheng et al. |
| 2008/0011298 A1 * | 1/2008 | Mazar et al. ............ 128/204.18 |

FOREIGN PATENT DOCUMENTS

| | | | |
|---|---|---|---|
| JP | 10320108 A | * | 12/1998 |
| WO | WO 2008/030976 | | 3/2008 |

OTHER PUBLICATIONS

JP 06241883 A (Original), Yonekura, Tatsuhiro, Sep. 2, 1994, pp. 1-3.*
JP 06241883 A (English Translation), Sep. 2, 1994, pp. 1-6.*
European Patent Office, International Search Report, in PCT/US03/32203, dated Aug. 24, 2005.
European Patent Office, Preliminary Examination Report, in PCT/US03/32203, dated Mar. 29, 2006.
United States Patent and Trademark Office, Office Action, in U.S. Appl. No. 10/530,946, dated Oct. 5, 2007.
International Search Report and Written Opinion for International Patent Application Serial No. PCT/US09/38397, dated May 26, 2009.
International Search Report and Written Opinion for International Patent Application Serial No. PCT/US09/038395, dated May 27, 2009.
International Search Report and Written Opinion for International Patent Application Serial No. PCT/US2009/038384, dated Jun. 10, 2009.
McGraw-Hill Dictionary of Scientific and Technical Terms—Sixth Edition, © 2003, The McGraw-Hill Companies, Inc. (4 pages).

* cited by examiner

METHOD AND SYSTEM FOR PROCESSING SIGNALS THAT CONTROL A DEVICE USING HUMAN BREATH

CROSS-REFERENCE TO RELATED APPLICATIONS/INCORPORATION BY REFERENCE

The present application is a continuation-in-part of U.S. patent application Ser. No. 10/453,192, filed Jun. 2, 2003, now U.S. Pat. No. 7,584,064, which is a continuation of U.S. patent application Ser. No. 09/913,398, filed Aug. 10, 2001, now U.S. Pat. No. 6,574,571, which is a U.S. national application filed under 35 U.S.C. 371 of International Application No. PCT/FR00/00362, filed Feb. 14, 2000. This application makes reference to:
U.S. application Ser. No. 12/056,164, filed Mar. 26, 2008;
U.S. application Ser. No. 12/055,999, filed Mar. 26, 2008;
U.S. application Ser. No. 12/056,203, filed Mar. 26, 2008;
U.S. application Ser. No. 12/056,061, filed Mar. 26, 2008; and
U.S. application Ser. No. 12/056,187, filed Mar. 26, 2008.

Each of U.S. application Ser. Nos. 12/056,164, 12/055,999, 12/056,203, 12/056,061, and 12/056,187 is hereby incorporated herein by reference, in its respective entirety.

FEDERALLY SPONSORED RESEARCH OR DEVELOPMENT

Not Applicable

MICROFICHE/COPYRIGHT REFERENCE

Not Applicable

FIELD OF THE INVENTION

Certain embodiments of the invention relate to controlling a computer or electronic system. More specifically, certain embodiments of the invention relate to a method and system for processing signals that control a device using human breath.

BACKGROUND OF THE INVENTION

Mobile communications have changed the way people communicate and mobile phones have been transformed from a luxury item to an essential part of every day life. The use of mobile phones is today dictated by social situations, rather than hampered by location or technology.

While voice connections fulfill the basic need to communicate, and mobile voice connections continue to filter even further into the fabric of every day life, the mobile access to services via the Internet has become the next step in the mobile communication revolution. Currently, most mobile devices are equipped with a user interface that allows users to access the services provided via the Internet. For example, some mobile devices may have browsers, and software and/or hardware buttons may be provided to enable navigation and/or control of the user interface. Some mobile devices such as Smartphones are equipped with touch screen capability that allows users to navigate or control the user interface via touching with one hand while the device is held in another hand.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for processing signals that control a device using human breath, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for processing signals that control a device using human breath. Exemplary aspects of the invention may comprise receiving at the device, one or more signals from a detection device operable to function as a human interface device (HID). The signals may be generated in response to detection of movement of air caused by expulsion of human breath. Human interfacing with a user interface such as a graphical user interface (GUI) of the device may be enabled via the received signals. The detection device may comprise a micro-electro-mechanical system (MEMS) detector. The received signals may be formatted into a HID profile. The HID profile may comprise one or more drivers and/or libraries that enables the interfacing with the GUI of the device. The drivers may enable one or more of initiation, establishment and/or termination of communication by the device.

Figure 1A:
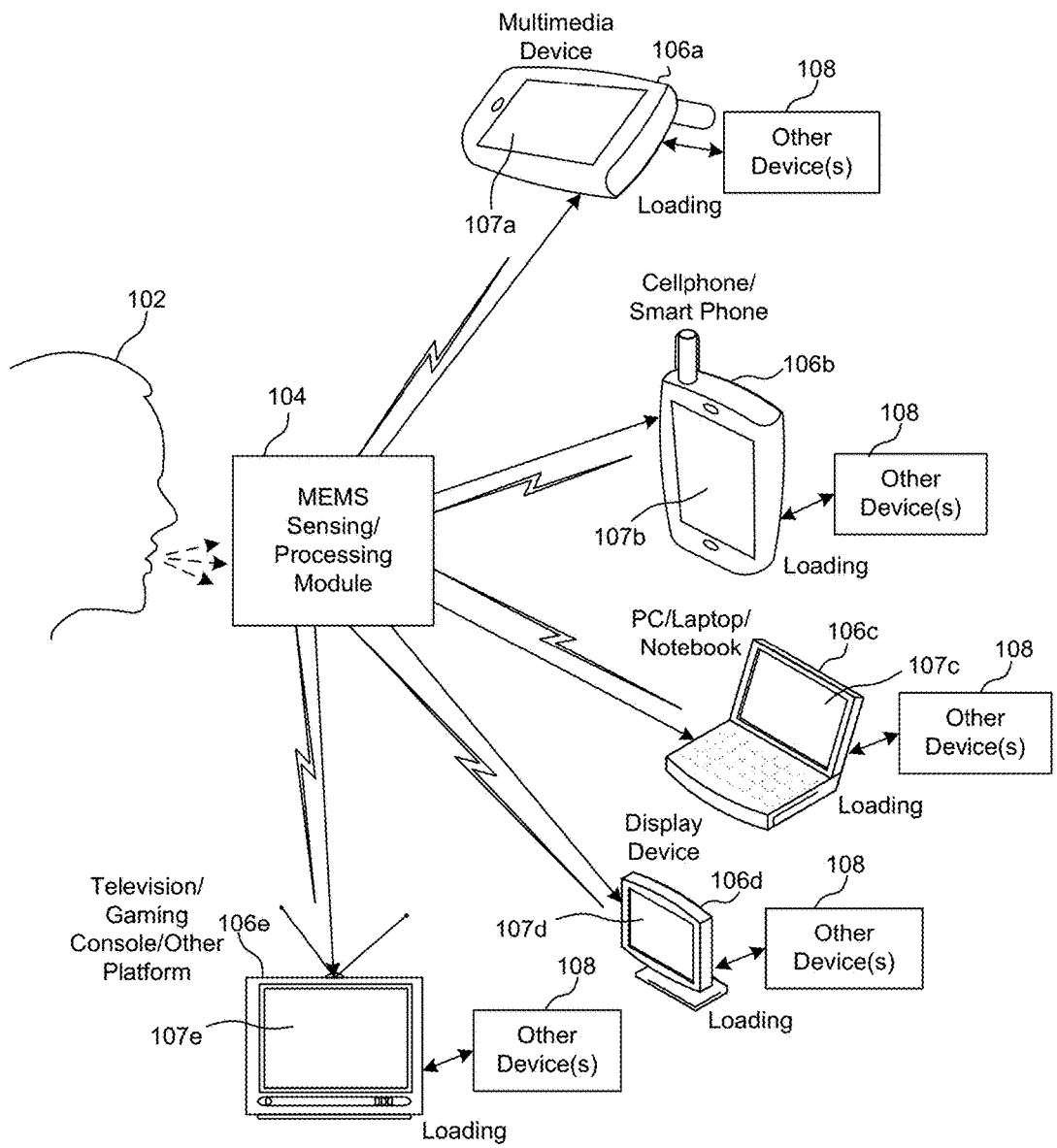
FIG. 1A is a block diagram of an exemplary system for controlling a user interface of a plurality of devices using human breath, in accordance with an embodiment of the invention.

FIG. 1A is a block diagram of an exemplary system for controlling a user interface of a plurality of devices using human breath, in accordance with an embodiment of the invention. Referring to FIG. 1A, there is shown a user 102, a micro-electro-mechanical system (MEMS) sensing and processing module 104, and a plurality of devices to be controlled, such as a multimedia device 106a, a cellphone/smartphone/dataphone 106b, a personal computer (PC), laptop or a notebook computer 106c, a display device 106d and/or a television (TV)/game console/other platform 106e. The multimedia device 106a may comprise a user interface 107a, the cellphone/smartphone/dataphone 106b may comprise a user interface 107b, and the personal computer (PC), laptop or a notebook computer 106c may comprise a user interface 107c. Additionally, the display device 106d may comprise a user interface 107d and the television (TV)/game console/other platform 106e may comprise a user interface 107e. Each of the plurality of devices to be controlled may be wired or wirelessly connected to a plurality of other devices 108 for loading of information, and/or communication of information, for example, peer-to-peer and/or network communication. Exemplary other devices 108 may comprise game consoles, immersive or 3D reality devices, and/or telematic devices. Telematic devices refers to devices comprising integrated computing, wireless communication and/or global navigation satellite system devices, which enables sending, receiving and/or storing of information over networks.

The MEMS sensing and processing module 104 may be enabled to detect movement caused by expulsion of human breath by the user 102. In response to the detection of movement caused by expulsion of human breath, the MEMS sensing and processing module 104 may be enabled to generate one or more controls signals. The MEMS sensing and processing module 104 may comprise one or more sensors, sensing segments and/or sensing members that may be operable to sense the kinetic energy generated by the expulsion of the human breath and accordingly generate the one or more control signals. The generated one or more control signals may be enabled to control a user interface of one or more of a plurality of devices, such as the user interface 107a of the multimedia device 106a, the user interface 107b of the cellphone/smartphone/dataphone 106b, the user interface 107c of the PC, laptop or a notebook computer 106c, the user interface 107d of the display device 106d, the user interface 107e of the TV/game console/other platform 106e, and the user interfaces of the mobile multimedia player and/or a remote controller. One exemplary embodiment of a user interface is a graphical user interface (GUI). Any information and/or data presented on a display including programs and/or applications may be part of the user interface. U.S. application Ser. No. 12/055,999 discloses an exemplary MEMS sensing and processing module and is hereby incorporated herein by reference in its entirety.

In accordance with an embodiment of the invention, the detection of the movement caused by expulsion of human breath may occur without use of a channel. The detection of the movement caused by expulsion of human breath may be responsive to the expulsion of human breath into open space, which is then sensed.

In accordance with another embodiment of the invention, the MEMS sensing and processing module 104 may be enabled to navigate within the user interface of one of more of the plurality of devices, such as a handheld device, for example, a multimedia device 106a, a cellphone/smartphone/dataphone 106b, a PC, laptop or a notebook computer 106c, a display device 106d, and/or a TV/game console/other platform 106e via the generated one or more control signals. The MEMS sensing and processing module 104 may be enabled to select one or more components within the user interface of the plurality of devices via the generated one or more control signals. The generated one or more control signals may comprise one or more of a wired and/or a wireless signal.

In accordance with another embodiment of the invention, one or more of the plurality of devices, such as a handheld device, for example, a multimedia device 106a and/or a cellphone/smartphone/dataphone 106b and/or a PC, laptop or a notebook computer 106c may be enabled to receive one or more inputs defining the user interface from another device 108. The other device 108 may be one or more of a PC, laptop or a notebook computer 106c and/or a handheld device, for example, and without limitation, a multimedia device 106a and/or a cellphone/smartphone/dataphone 106b. In this regard, data may be transferred from the other device 108 to the cellphone/smartphone/dataphone 106b and this data may be associated or mapped to media content that may be remotely accessed by the cellphone/smartphone/dataphone 106b via a service provider such as a cellular or PCS service provider. The transferred data that is associated or mapped to media content may be utilized to customize the user interface 107b of the cellphone/smartphone/dataphone 106b. In this regard, media content associated with one or more received inputs may become an integral part of the user interface of the device being controlled. The associating and/or mapping may be performed on either the other device 108 and/or one the cellphone/smartphone/dataphone 106b. In instances where the associating and/or mapping is performed on the other device 108, the associated and/or mapped data may be transferred from the other device 108 to the cellphone/smartphone/dataphone 106b.

In an exemplary embodiment of the invention, an icon transferred from the other device 108 to the cellphone/smartphone/dataphone 106b may be associated or mapped to media content such as an RSS feed, a markup language such as HTML, and XML, that may be remotely accessed by the cellphone/smartphone/dataphone 106b via the service provider of the cellphone/smartphone 106b. Accordingly, when the user 102 blows on the MEMS sensing and processing module 104, control signals generated by the MEMS sensing and processing module 104 may navigate to the icon and select the icon. Once the icon is selected, the RSS feed or markup language may be accessed via the service provider of the cellphone/smartphone/dataphone 106b and corresponding RSS feed or markup language content may be displayed on the user interface 107b. U.S. application Ser. No. 12/056,187 discloses an exemplary method and system for customizing a user interface of a device and is hereby incorporated herein by reference in its entirety.

In operation, a user 102 may exhale into open space and the exhaled breath may be sensed by one or more detection devices or detectors, such as one or more sensors, sensing members and/or sensing segments in the MEMS sensing and processing module 104. The MEMS sensing and processing module 104 may be enabled to detect movement caused by expulsion of human breath by the user 102. One or more electrical, optical and/or magnetic signals may be generated by one or more detection devices or detectors within the MEMS sensing and processing module 104 in response to the detection of movement caused by expulsion of human breath. The processor firmware within the MEMS sensing and processing module 104 may be enabled to process the received electrical, optical and/or magnetic signals from the one or more detection device(s) or detector(s) utilizing various algorithms and generate one or more control signals to the device being controlled, for example, the multimedia device 106a. The generated one or more control signals may be communicated to the device being controlled, for example, the multimedia device 106a via a wired and/or wireless signal. The processor in the device being controlled may utilize the communicated control signals to control the user interface of the device being controlled, such as a user interface 107a of the multimedia device 106a, a user interface 107b of the cellphone/smartphone/dataphone 106b, a user interface 107c of the personal computer (PC), laptop or a notebook computer 106c, a user interface 107d of the display device 106d, a user interface 107e of the TV/game console/other platform 106e, and a user interface of a mobile multimedia player and/or a remote controller.

Figure 1B:
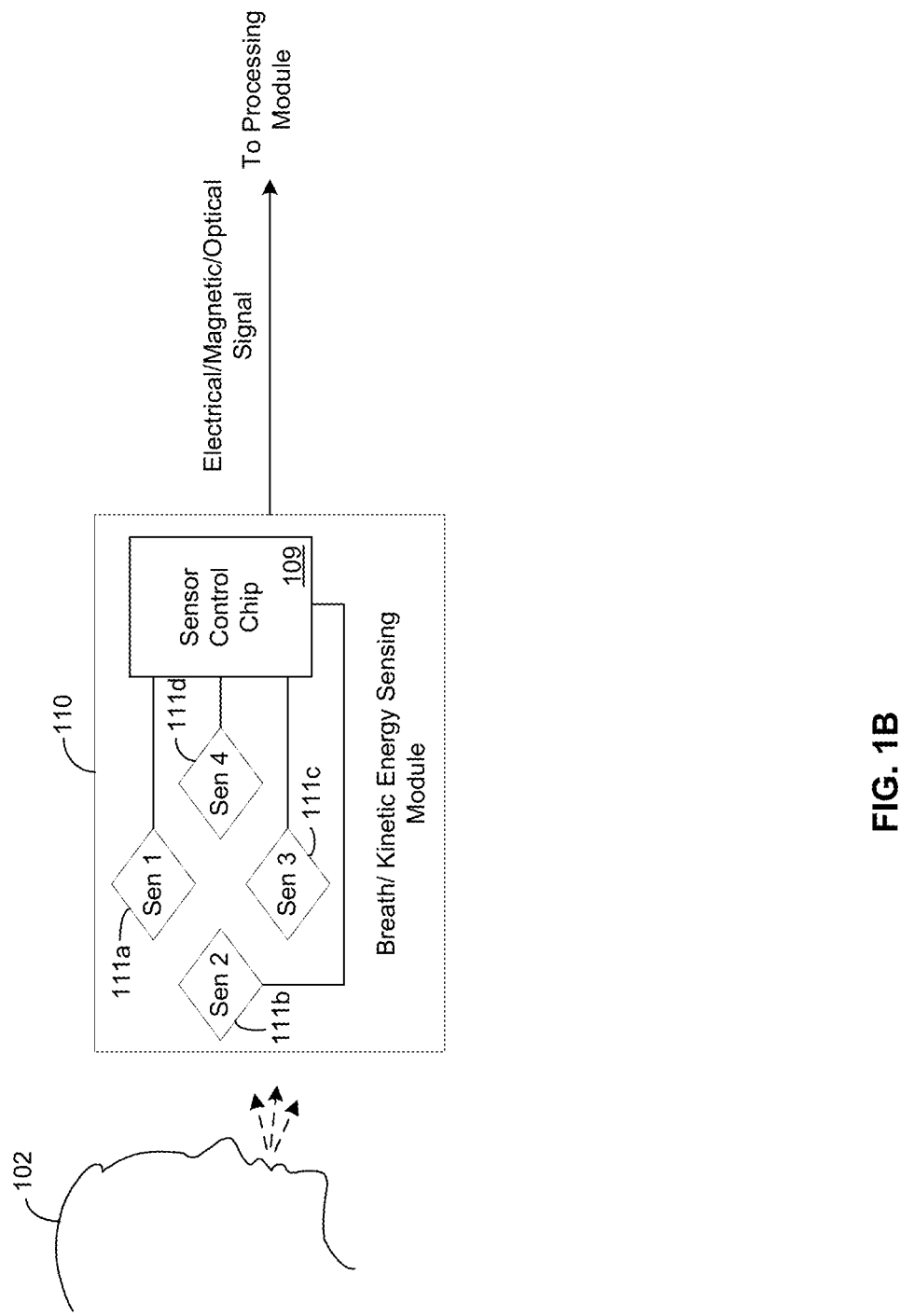
FIG. 1B is a block diagram of an exemplary sensing module to detect human breath, in accordance with an embodiment of the invention.

FIG. 1B is a block diagram of an exemplary detection device or detector to detect human breath, in accordance with an embodiment of the invention. Referring to FIG. 1B, there is shown a user 102 and a sensing module 110. The sensing module 110 may comprise a sensor control chip 109 and a plurality of sensors, sensing members and/or sensing segments, for example, 111a, 111b, 111c, and 111d. Notwithstanding, the invention may not be so limited and the sensing module 110 may comprise more or less than the number of sensors, sensing members and/or sensing segments shown in FIG. 1B without limiting the scope of the invention. Accordingly, any number of detectors and sources may be utilized according to the desired size, sensitivity, and resolution desired. Similarly, the type of sources and detectors may comprise other sensing mechanisms, other than visible light. For example, piezoelectric, ultrasonic, Hall effect, electrostatic, and/or permanent or electromagnet sensors may be activated by deflected MEMS members to generate a signal to be communicated to the sensor control chip 109.

The sensing module 110 may be an electrochemical sensor or any other type of breath analyzing sensor, for example. The plurality of sensors, sensing members and/or sensing segments 111a-d may be an integral part of one or more MEMS devices that may enable the detection of various velocities of air flow from the user's 102 breath. The plurality of sensors, sensing members and/or sensing segments 111a-d may be enabled to detect kinetic energy and/or movement caused by the expulsion of human breath by the user 102. The sensor control chip 109 may be enabled to generate an electrical, optical and/or magnetic signal that may be communicated to the processor in response to the detection of kinetic energy and/or movement caused by expulsion of human breath.

Figure 1C:
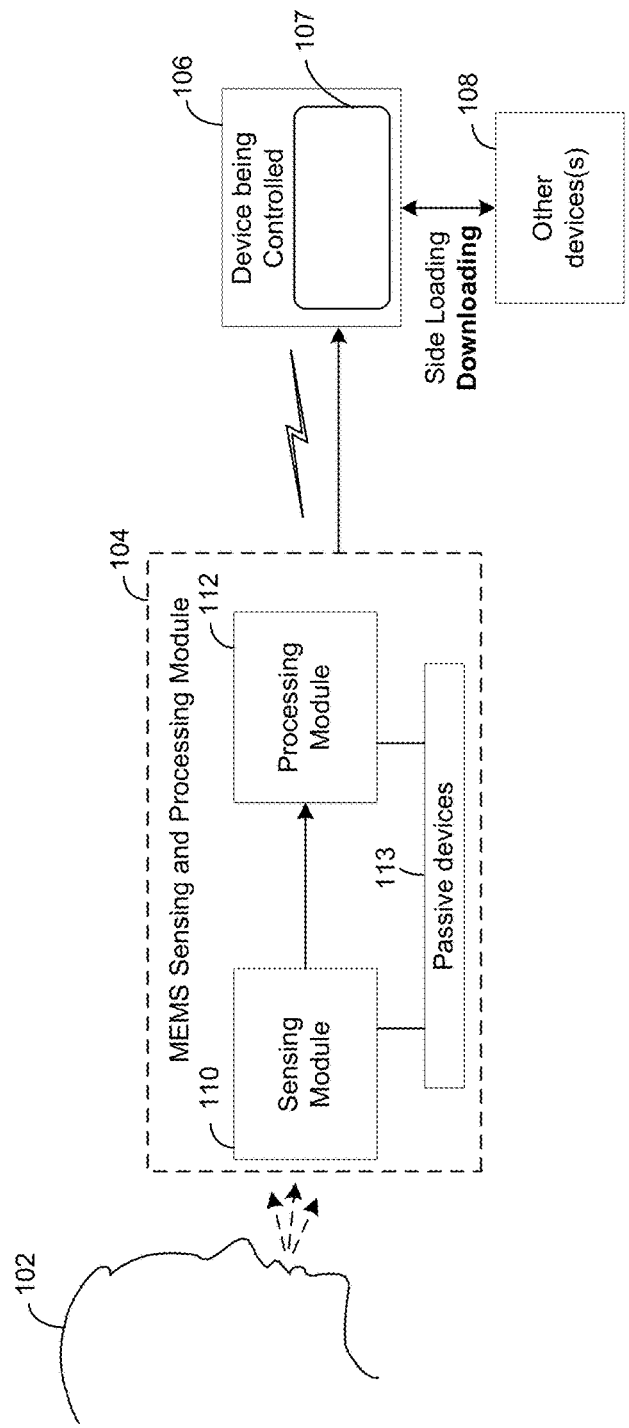
FIG. 1C is a block diagram of another embodiment of an exemplary system for controlling a user interface of a device using human breath, in accordance with an embodiment of the invention.

FIG. 1C is a block diagram of another embodiment of an exemplary system for controlling a user interface of a device using human breath, in accordance with an embodiment of the invention. Referring to FIG. 1C, there is shown a user 102, a MEMS sensing and processing module 104, and a device being controlled 106, such as a multimedia device 106a, a cellphone/smartphone/dataphone 106b, a PC, laptop or a notebook computer 106c, a display device 106d and/or a TV/game console/other platform 106e. The device being controlled 106 may be wired and/or wirelessly connected to a plurality of other devices 108 for loading of information via, for example, side loading or other communication comprising, peer-to-peer communication, network communication, via wired and/or wireless connection.

The MEMS sensing and processing module 104 may comprise a sensing module 110, a processing module 112 and passive devices 113. The passive devices 113, which may comprise resistors, capacitors and/or inductors, may be embedded within a substrate material of the MEMS processing sensing and processing module 104. The processing module 112 may comprise, for example, an ASIC. The sensing module 110 may generally be referred to as a detection device or detector, and may comprise one or more sensors, sensing members and/or sensing segments that may be enabled to detect kinetic energy and/or movement caused by the expulsion of human breath by the user 102. The sensing module 110 may be enabled to generate an electrical, optical and/or magnetic signal that may be communicated to the processing module 112 in response to the detection of kinetic energy and/or movement caused by expulsion of human breath.

The processing module 112 may comprise suitable logic, circuitry and/or code that may be enabled to receive the generated electric signal from the sensing module 110 and generate one or more control signals to the device being controlled 106. In this regard, the processing module 112 may comprise one or more analog to digital converters that may be enabled to translate the sensed signal to one or more digital signals, which may be utilized to generate the one or more control signals. The generated one or more control signals may be enabled to control a user interface of the device being controlled 106.

The device being controlled 106 may comprise a user interface 107. Accordingly, the generated one or more signals from the MEMS sensing and processing module 104 may be communicated to the device being controlled 106 and utilized to control the user interface 107. In an exemplary embodiment of the invention, the one or more signals generated by the MEMS sensing and processing module 104 may be operable to control a pointer on the device being controlled 106 such that items in the user interface 107 may be selected and/or manipulated. In an exemplary embodiment of the invention, the device being controlled may be enabled to receive one or more inputs from the other devices 108, which may be utilized to customize or define the user interface 107. The other device 108 may be one or more of a PC, laptop or a notebook computer 106c and/or a handheld device, for example, a multimedia device 106a and/or a cellphone/smartphone/dataphone 106b. In this regard, the other device 108 may be similar to or different from the type of device that is being controlled 106. In some embodiments of the invention, a processor in the other device 108 may be operable to associate or map the data to media content that is remotely accessible by the device being controlled 106. In other embodiments of the invention, a processor in the device being controlled 106 may be operable to associate or map the data to media content that is remotely accessible by the device being controlled 106. U.S. application Ser. No. 12/056,187 discloses an exemplary method and system for customizing a user interface of a device and is hereby incorporated herein by reference in its entirety.

Figure 1D:
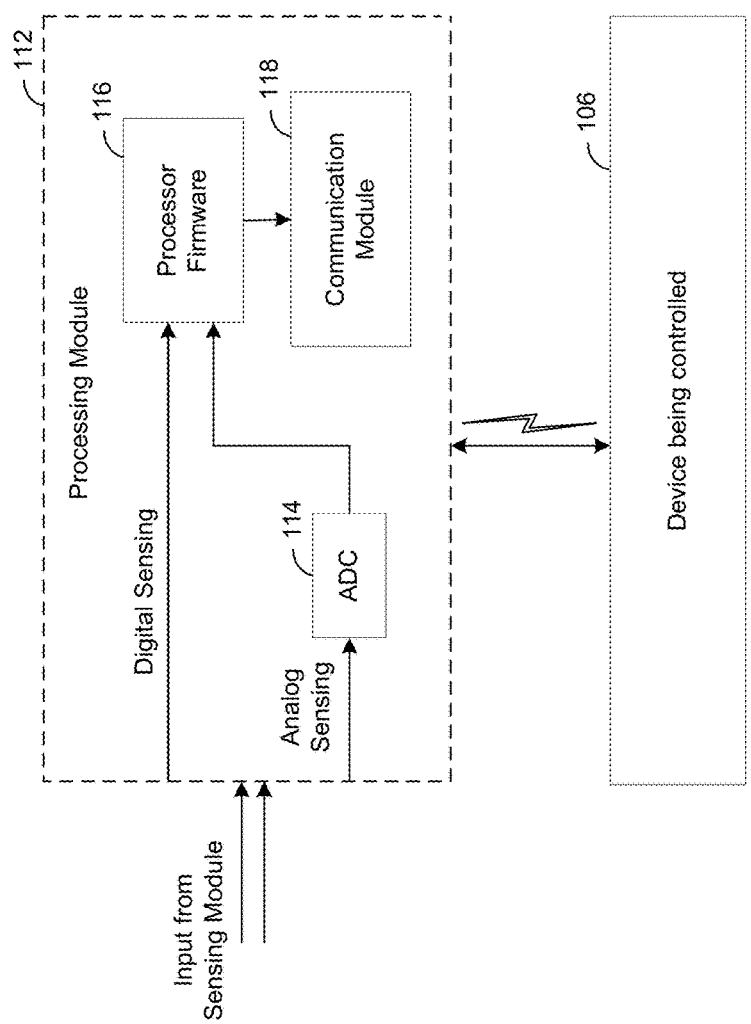
FIG. 1D is a block diagram of an exemplary processor interacting with a device being controlled, in accordance with an embodiment of the invention.

FIG. 1D is a block diagram of an exemplary processor interacting with a device being controlled, in accordance with an embodiment of the invention. Referring to FIG. 1D, there is shown a processing module 112, and a device being controlled 106 such as a multimedia device 106a, a cellphone/smartphone/dataphone 106b, a PC, laptop or a notebook computer 106c, a display device 106d and/or a TV/game console/other platform 106e. The processing module 112 may be an ASIC and may comprise one or more analog to digital converters (ADCs) 114, processor firmware 116, and a communication module 118.

The processing module 112 may comprise suitable logic, circuitry and/or code that may be enabled to receive a digital sensing signal and/or an analog sensing signal from the sensing module 110. The ADC 114 may comprise suitable logic, circuitry and/or code that may be enabled to receive the generated analog sensing signal from the sensing module 110 and convert the received signal into a digital signal.

The processor firmware 116 may comprise suitable logic, and/or code that may be enabled to receive and process the digital signal from the ADC 114 and/or the digital sensing signal from the sensing module 110 utilizing a plurality of algorithms to generate one or more control signals. For example, the processor firmware 116 may be enabled to read, store, calibrate, filter, modelize, calculate and/or compare the outputs of the sensing module 110. The processor firmware 116 may also be enabled to incorporate artificial intelligence (AI) algorithms to adapt to a particular user's 102 breathing pattern. The processor firmware 116 may be enabled to generate one or more control signals to the device being controlled 106 based on processing the received digital signals. The generated one or more control signals may be enabled to control a user interface of the device being controlled 106, for example, scrolling, zooming, and/or 3-D navigation within the device being controlled 106.

The communication module 118 may comprise suitable logic, circuitry and/or code that may be enabled to receive and communicate the generated one or more control signals to the device being controlled 106 via a wired and/or a wireless signal. The communication module 118 may support a plurality of interfaces. For example, the communication modules 118 and 120 may support an external memory interface, a universal asynchronous receiver transmitter (UART) interface, an enhanced serial peripheral interface (eSPI), a general purpose input/output (GPIO) interface, a pulse-code modulation (PCM) and/or an inter-IC sound ($I^2S$) interface, an inter-integrated circuit ($I^2C$) bus interface, a universal serial bus (USB) interface, a Bluetooth interface, a ZigBee interface, an IrDA interface, and/or a wireless USB (W-USB) interface. The device being controlled 106 may be enabled to receive the communicated control signals via a wired and/or a wireless signal. The device being controlled 106 may be enabled to utilize the received one or more control signals to control the user interface.

Figure 1E:
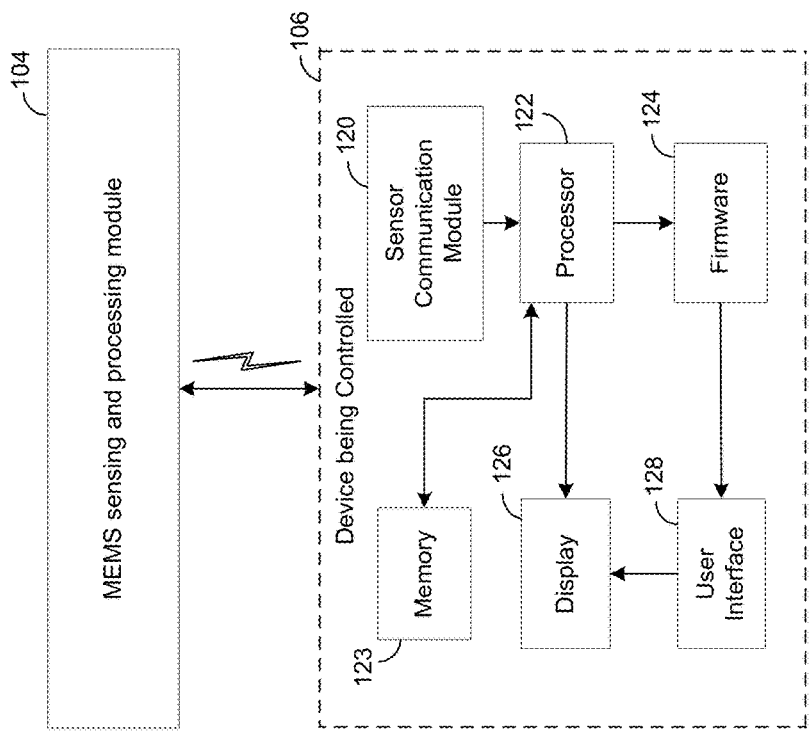
FIG. 1E is a block diagram of an exemplary MEMS sensing and processing module interacting with a device being controlled, in accordance with an embodiment of the invention.

FIG. 1E is a block diagram of an exemplary MEMS sensing and processing module interacting with a device being controlled, in accordance with an embodiment of the invention. Referring to FIG. 1E, there is shown a MEMS sensing and processing module 104 and a device being controlled 106 such as a multimedia device 106a, a cell phone/smart phone 106b, a PC, laptop or a notebook computer 106c, a display device 106d and/or a TV/game console/other platform 106e. The device being controlled 106 may comprise a communication module 120, a processor 122, memory 123, firmware 124, a display 126, and a user interface 128.

The communication module 120 may comprise suitable logic, circuitry and/or code that may be enabled to receive the generated one or more control signals from the MEMS sensing and processing module 104 via a wired and/or a wireless signal. The communication module 120 may support a plurality of interfaces. For example, the communication module 120 may support an external memory interface, a universal asynchronous receiver transmitter (UART) interface, an enhanced serial peripheral interface (eSPI), a general purpose input/output (GPIO) interface, a pulse-code modulation (PCM) and/or an inter-IC sound ($I^2S$) interface, an inter-integrated circuit ($I^2C$) bus interface, a universal serial bus (USB) interface, a Bluetooth interface, a ZigBee interface, an IrDA interface, and/or a wireless USB (W-USB) interface.

The processor 122 may comprise suitable logic, circuitry and/or code that may be enabled to utilize the received one or more control signals to control the user interface 128 and/or the display 126. The memory may comprise suitable logic, circuitry and/or code that may be enabled to store data on the device being controlled 106. The firmware 124 may comprise a plurality of drivers and operating system (OS) libraries to convert the received control signals into functional commands. The firmware 124 may be enabled to map local functions, and convert received control signals into compatible data, such as user customization features, applets, and/or plugins to control the user interface 128.

Figure 2:
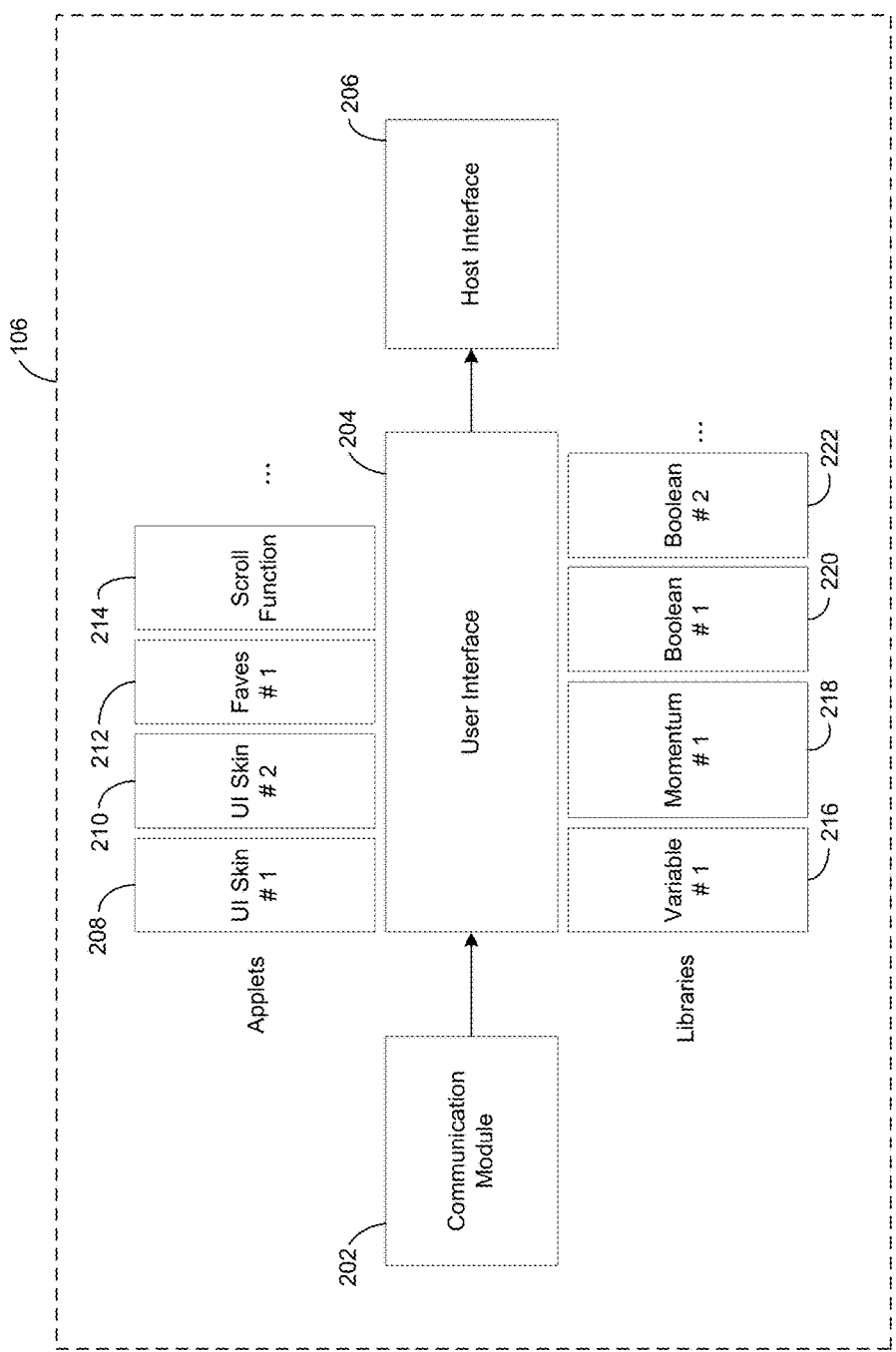
FIG. 2 is a block diagram of an exemplary user interface interacting with a MEMS sensing and processing module and a host system, in accordance with an embodiment of the invention.

FIG. 2 is a block diagram of an exemplary user interface interacting with a MEMS sensing and processing module and a host system, in accordance with an embodiment of the invention. Referring to FIG. 2, there is shown a device being controlled 106. The device being controlled 106 may comprise a communication module 202, a user interface 204 and a host interface 206, a plurality of drivers and/or libraries 206, 218, 220 and 222 and a plurality of applets 208, 210, 212 and 214. The user interface 204 may be a graphical user interface (GUI), for example.

The communication module 202 may comprise suitable logic circuitry, and/or code that may be enabled to receive one or more signals from the MEMS sensing and processing module 104 operable to function as a driver, and/or an interface such as a human interface device (HID). For example, if the received signal is not compliant with a supported HID profile, that is, the signal is not a supported HID class, then the received signal may be passed to a driver such as a custom expulsion of air driver or a air detection driver for processing on the device being controlled 106. The received signal may be processed in the device being controlled 106 using the driver. The one or more signals may be generated in response to detection of movement of air caused by the expulsion of human breath by user 102. The communication module 202 may be enabled to receive one or more signals from the MEMS sensing and processing module 104 via a wired and/or a wireless signal. The communication module 202 may support a plurality of drivers, interfaces and/or HID profiles. For example, the communication module 120 may support an external memory interface, a universal asynchronous receiver transmitter (UART) interface, an enhanced serial peripheral interface (eSPI), a general purpose input/output (GPIO) interface, a pulse-code modulation (PCM) and/or an inter-IC sound ($I^2C$) interface, an inter-integrated circuit ($I^2C$) bus interface, a universal serial bus (USB) interface and/or HID profile, a Bluetooth interface and/or HID profile, a ZigBee interface and/or HID profile, an IrDA interface and/or HID profile, and/or a wireless USB (W-USB) interface and/or a HID profile.

The user 102 may be enabled to interface with the GUI 204 of the device being controlled 106 via the one or more received signals. The received one or more signals may be compliant with one or more drivers, a universal serial bus (USB) HID class and/or a wireless protocol HID class, such as wireless USB HID class and/or a ZigBee HID class, for example. Notwithstanding, the invention may not be so limited and one or more drivers and/or other wireless protocol HID classes may be utilized without limiting the scope of the invention. Currently, Bluetooth utilizes the USB HID class. Furthermore, if the received signal is not compliant with a supported HID profile, that is, the signal is not a supported HID class, then the received signal may be passed to a driver such as a custom expulsion of air driver or a air detection driver for processing on the device being controlled 106. The received signal may be processed in the device being controlled 106 using the driver.

The communication module 202 may be enabled to format the received one or more signals into a HID profile. The HID profile may comprise one or more drivers and/or libraries 216-222 that may enable interfacing with the GUI 204 of the device being controlled 106. The one or more drivers and/or libraries 216-222 may enable one or more of initiation, establishment and/or termination of communication by the device being controlled 106 with the MEMS sensing and processing module 104. The HID profile may define protocols, procedures, and/or usage scenarios for using the HID, such as the MEMS sensing and processing module 104 over a wired and/or wireless link, such as Bluetooth. The device being controlled 106 may host a wireless protocol stack, such as the Bluetooth stack which may use the Service Discovery Protocol (SDP) to discover HIDs, such as the MEMS sensing and processing module 104.

In accordance with an embodiment of the invention, the device being controlled 106 may be enabled to receive from the HID, such as the MEMS sensing and processing module 104 before it is activated, device information, such as descriptors to the class drivers and/or libraries 216-222. The drivers and/or libraries 216-222 may be enabled to utilize the descriptors to determine device characteristics in order to enable controls on the device being controlled 106.

For example, the library, variable #1 216 may be enabled to detect the direction of expulsion of human breath onto the HID, such as the MEMS sensing and processing module 104 and accordingly convert the received signal into a directional signal that controls one or more components of the user interface 204. The library, momentum #1 218 may be enabled to detect a puff of air exhaled by the user 102, and accordingly utilize the corresponding received signal from the MEMS sensing and processing module 104 to scroll through one or more menus of the user interface 204 and slow down after a particular period of time. The library, Boolean #1 220 may be enabled to utilize the received signal from the MEMS sensing and processing module 104 to select one or more menus and/or icons within the user interface 204. The library, Boolean #2 222 may also be enabled to utilize the received signal from the MEMS sensing and processing module 104 to select one or more menus and/or icons within the user interface 204. Notwithstanding, the invention may not be so limited and other driver and/or libraries may be utilized without limiting the scope of the invention.

The device being controlled 106 may be enabled to interface with the detection device, such as the MEMS sensing and processing module 104 utilizing one or more applets 208-214. The applets 208-214 may comprise software components, code and/or programs that may be enabled to run in context of another program, such as a web browser, for example. For example, the applet, UI skin #1 208 may comprise a software component, code and/or program that may function as a pinwheel, where a plurality of icons may cycle through the background of the user interface 204. The user 102 may be prompted to select one or more icons from the background of the user interface 204 of the device being controlled 106. The applet, UI skin #2 210 may comprise a software component, code and/or program that may enable dissolving one or more icons on the user interface 204 into dust, for example, when a user 102 blows air at the icons being displayed on the GUI 204. In another embodiment, one of the applets may comprise a software component, code and/or program that may function as a 3-D flipbook, where a user 102 may be enabled to blow air at a book on the GUI 204 to turn one or more pages within the book. The applet, Faves #1 212 may comprise a software component, code and/or program that may enable morphing two or more pictures of users or friends on the GUI 204 into a single picture, when a user 102 blows air onto the two or more pictures of users or friends on the GUI 204. The applet, Scroll Function 214 may comprise a software component, code and/or program that may enable scrolling through a plurality of menus, pages and/or icons on the GUI 204. The GUI 204 of the device being controlled 106 may be enabled to interface with the MEMS sensing and processing module 104 based on one or more outputs generated by the applets 208-214.

The host computer interface (HCI) 206 may comprise an interface to a display, other hardware and/or processors within the device being controlled 106 for controller management, link establishment, and/or maintenance, for example. A HCI transport layer may be enabled to deliver HCI commands to the other hardware within the device being controlled 106.

In accordance with an embodiment of the invention, the human or user 102 interfacing with the GUI 204 may be agnostic to any particular operating system (OS) platform on the device being controlled 106. For example, the device being controlled 106 may be running on any one or more of a Windows OS, Symbian OS, Android OS, Palm OS, or other operating systems on mobile phones such as the iphone or a Blackberry phone. Notwithstanding, the invention may not be so limited and other operating systems may be utilized without limiting the scope of the invention.

Figure 3:
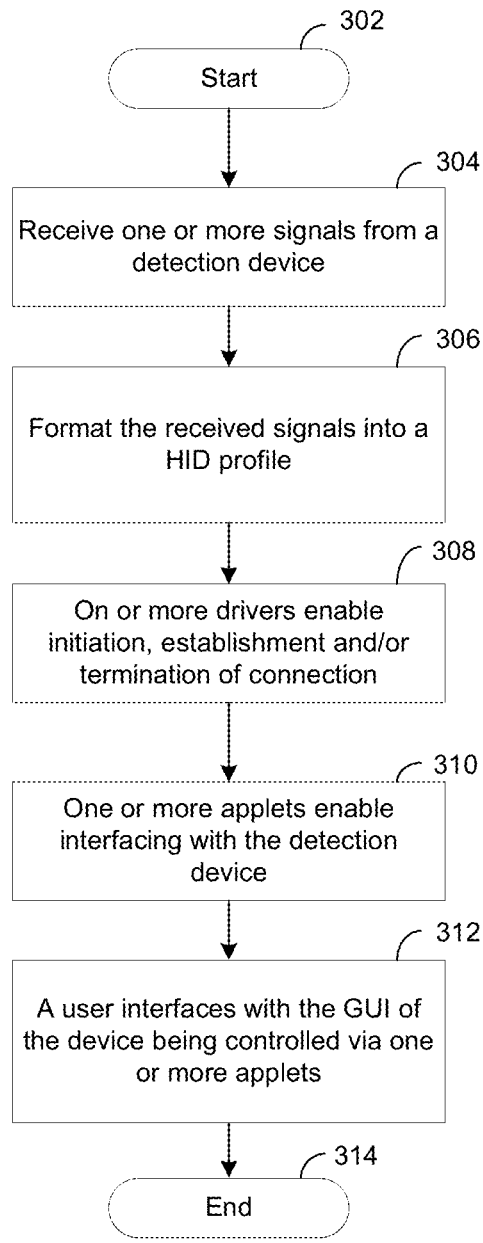
FIG. 3 is a flowchart illustrating exemplary steps for processing signals that control a device using human breath.

FIG. 3 is a flowchart illustrating exemplary steps for processing signals that control a device using human breath. Referring to FIG. 3, exemplary steps may begin at step 302. In step 304, one or more signals may be received from a detection device, operable to function as a human interface device (HID) such as the MEMS sensing and processing module 104. The detection device may comprise a micro-electro-mechanical system (MEMS) detector. The one or more signals may be generated in response to detection of movement of air caused by the expulsion of human breath. In step 306, the device being controlled 106 may be enabled to format the received one or more signals into a HID profile. The HID profile may comprise one or more drivers and/or libraries 216-222 that may enable interfacing with the GUI 204 of the device being controlled 106. In step 308, the one or more drivers and/or libraries 216-222 may enable one or more of initiation, establishment and/or termination of communication by the device being controlled 106 with the MEMS sensing and processing module 104. In step 310, one or more applets 208-214 within the device being controlled 106 may be enabled to interface with the detection device, such as the MEMS sensing and processing module 104. In step 312, the user 102 may be enabled to interface with a graphical user interface (GUI) 128 of the device being controlled 106 via the one or more received signals utilizing one or more applets 208-214. Control then passes to end step 314.

Figure 4:
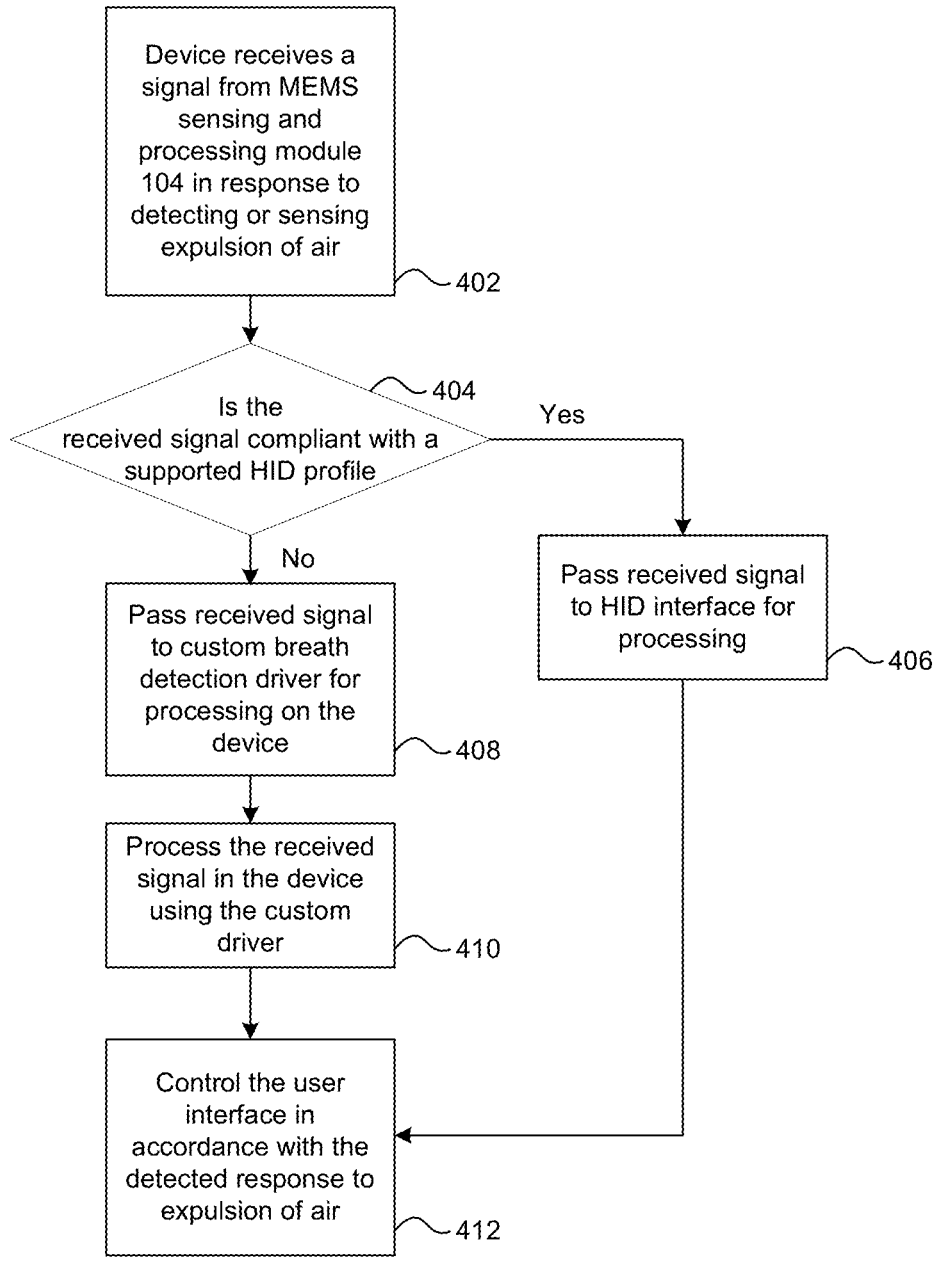
FIG. 4 is a flowchart illustrating exemplary steps for processing signals that control a device using human breath.

FIG. 4 is a flowchart illustrating exemplary steps for processing signals that control a device using human breath.

Referring to FIG. 4, in step 402, a device such as the device being controlled 106 (FIG. 1E) may receive a signal from the MEMS sensing and processing module 104 in response to detecting or sensing expulsion of air. In step 404, it may be determined whether the received signal is compliant with a supported HID profile. In instances where the received signal is compliant with a supported HID profile, that is within a supported HID class, then in step 406, the received signal may be communicated to the HID interface for processing. In step 412, the user interface 128 of the device being controlled 106 may be controlled in accordance with the detected response to expulsion of air.

Returning to step 404, if it is determined that the received signal is not compliant with a supported HID profile, that is, the signal is not is a supported HID class, then control passes to step 408. In step 408, the received signal is passed to a custom expulsion of air driver or a breath detection driver for processing on the device being controlled 106. In step 410, the received signal is processed in the device being controlled 106 using the custom driver. In step 412, the user interface 128 of the device being controlled 106 may be controlled in accordance with the detected response to expulsion of air.

In accordance with an embodiment of the invention, a method and system for processing signals that control a device using human breath may comprise a device being controlled 106 that receives one or more signals from a detection device, operable to function as a human interface device (HID) such as the MEMS sensing and processing module 104. The one or more signals may be generated in response to detection of movement of a fluid such as air, which may be caused by, for example, the expulsion of human breath. The user 102 may be enabled to interface with a user interface such as the graphical user interface (GUI) 128 of the device being controlled 106 via the one or more received signals. The device being controlled 106 may be one or more of a multimedia device 106a, a cell phone/smart phone 106b, a PC, laptop or a notebook computer 106c, a display device 106d, a TV/game console/other platforms 106e, telemetric device, a mobile multimedia player and/or a remote controller. The detection device may comprise a micro-electro-mechanical system (MEMS) detector.

The device being controlled 106 may be enabled to format the received one or more signals into a HID profile and/or a device driver formats. The HID profile may comprise one or more drivers and/or libraries 216-222 that may enable interfacing with the GUI 204 of the device being controlled 106. The one or more drivers and/or libraries 216-222 may enable one or more of initiation, establishment and/or termination of communication by the device being controlled 106 with the MEMS sensing and processing module 104.

In accordance with an embodiment of the invention, the interfacing of the MEMS sensing and processing module 104 with the device being controlled 106 may be agnostic to any particular operating system (OS) platform on the device being controlled 106. The received one or more signals may comprise digital signals. The received one or more signals may be compliant with a universal serial bus (USB) HID class and/or a wireless protocol HID class, such as wireless USB, ZigBee protocols. The device being controlled 106 may be enabled to interface with the detection device, such as the MEMS sensing and processing module 104 utilizing one or more applets 208-214. The MEMS sensing and processing module 104 may be enabled to interface with the GUI 128 of the device being controlled 106 based on one or more outputs generated by the applets 208-214.

In accordance with an embodiment of the invention, a method for interaction may comprise interfacing with a device being controlled 106 via expulsion of air utilizing a human interface device (HID) profile. The source of the expulsion of air may be human breath.

Figure 5:
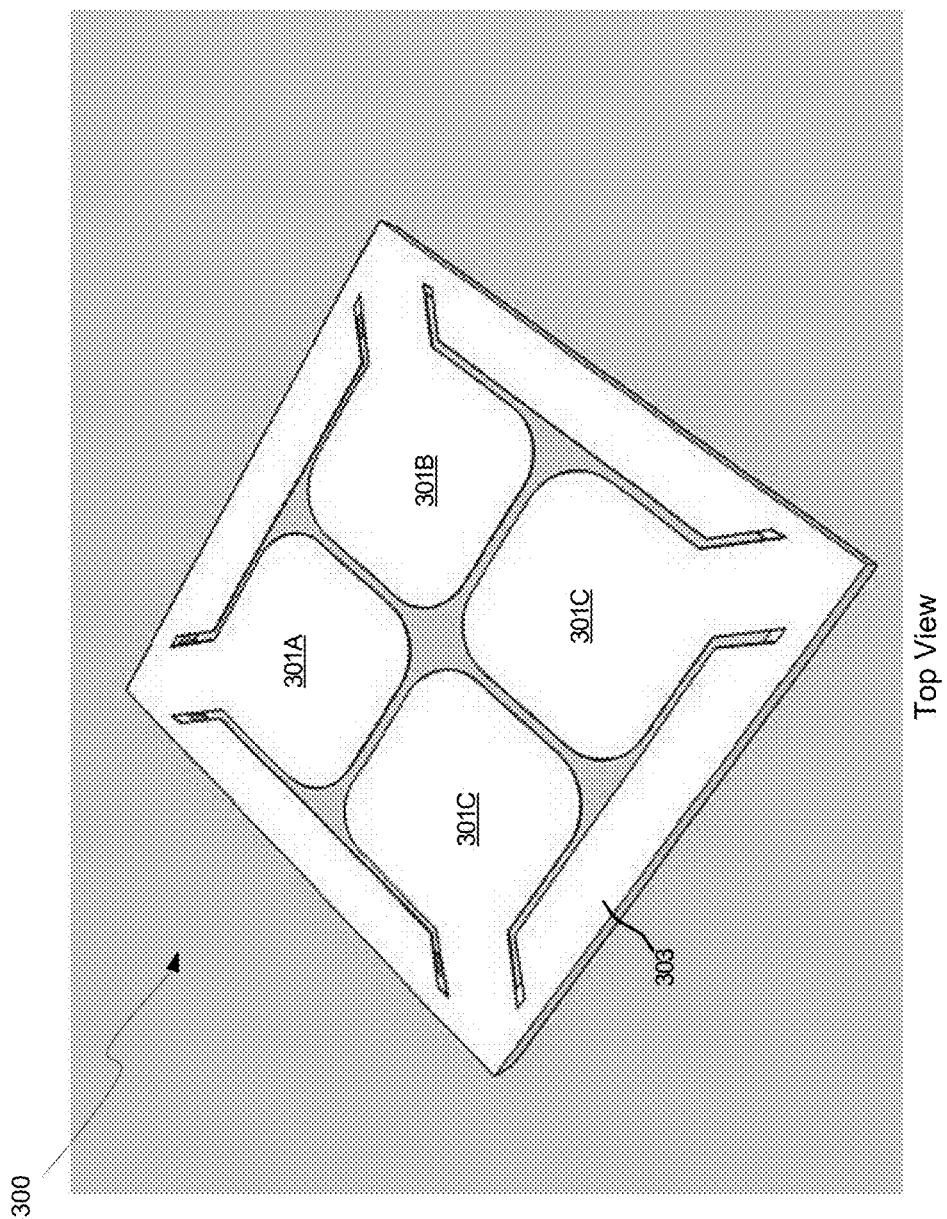
FIG. 5 is a block diagram illustrating an exemplary MEMS deflectable member structure, in accordance with an embodiment of the invention.

FIG. 5 is a block diagram illustrating an exemplary MEMS deflectable member structure, in accordance with an embodiment of the invention. Referring to FIG. 5, there is shown a MEMS member array 300 comprising the deflectable members 301A-301D and the support structure 303. The deflectable members 301A-301D may also be referred to as moveable members or segments. In an embodiment of the invention, the MEMS member array 300 may comprise a micro-machined silicon (Si) structure, such that the thickness of the deflectable members 301A-301D may be physically deflected by air flow without breaking. The MEMS member array 300 may be fabricated utilizing MEMS techniques, such as anisotropic etching, for example.

Figure 6:
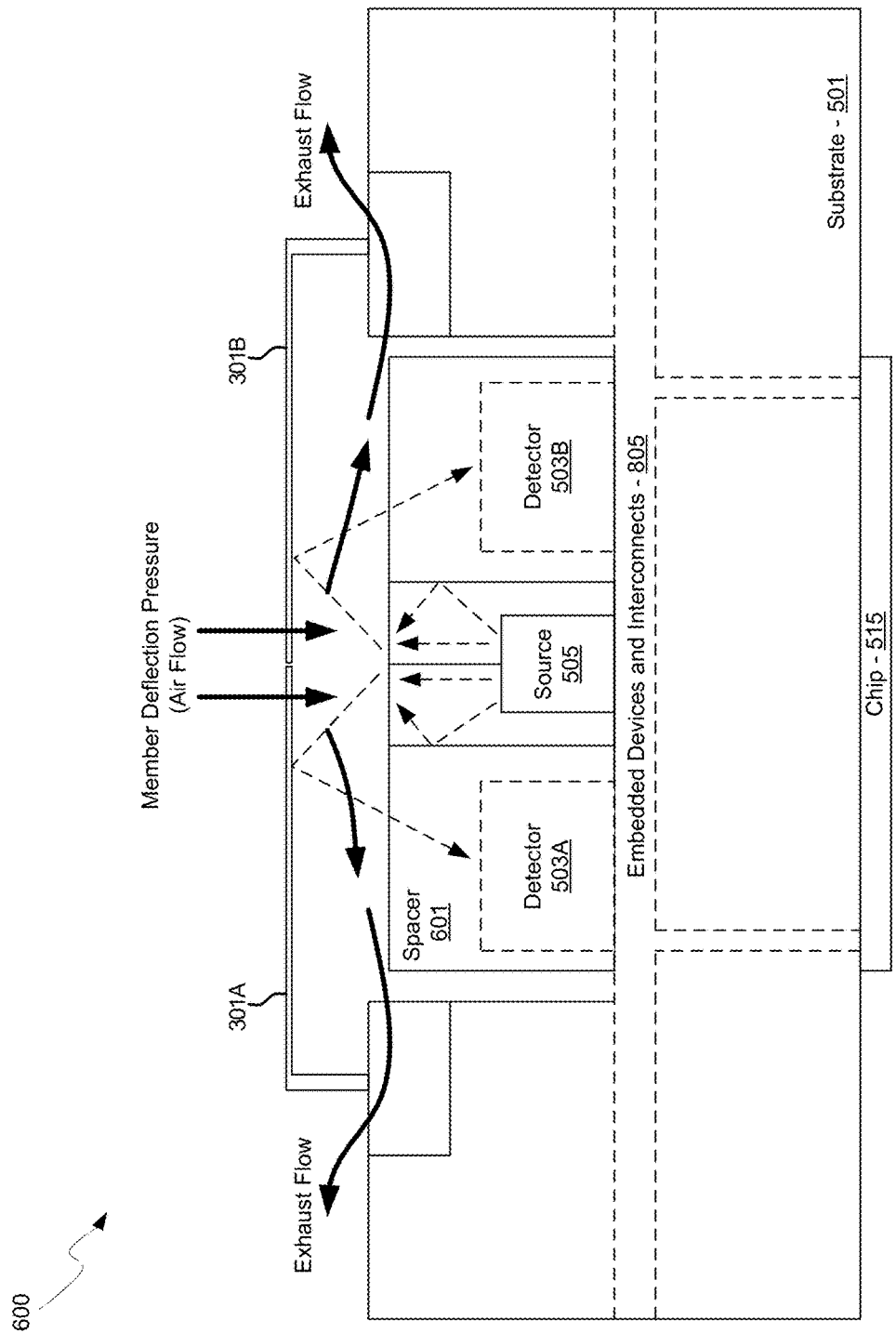
FIG. 6 is a block diagram illustrating an exemplary MEMS detector module cross-section, in accordance with an embodiment of the invention.

The support structure 303 may comprise a rigid support structure that may suspend the deflectable members 301A-301D and may enable the MEMS member array 300 to be integrated within a detector package, as described, for example, at least with respect to FIG. 6.

In operation, the deflectable members 301A-301D may be deflected or moved by air flow resulting from the expulsion air, for example, air from a user's breath. In an embodiment of the invention, a light source may be reflected off of the bottom surface of the deflectable members 301A-301D, such that the amount of deflection may be determined by measuring a light signal received from the reflection off of each of the deflectable members 301A-301D. In various embodiments of the invention, the source and detectors to determine the deflection of the deflectable members 301A-301D may utilize other sensing techniques such as piezoelectric, Hall effect, ultrasonic, magnetic, or electrostatic, for example. In instances where a piezoelectric technique may be utilized, the deflection of the deflectable members 301A-301D may generate an electrical signal proportional to the applied air flow by compressing a piezoelectric material. In another embodiment of the invention, a capacitance value may be adjusted by the deflection of the deflectable members 301A-301D, with the change in capacitance generating an electrical signal. In yet another embodiment of the invention, permanent magnets or electromagnets may be utilized adjacent to or on the surface of said deflectable members 301A-301D to generate a current proportional to the speed of the air flow. Thus, the measurement technique is not limited to optical measurements. Accordingly, a variety of deflection measurement techniques may be utilized.

FIG. 6 is a block diagram illustrating an exemplary MEMS detector module cross-section, in accordance with an embodiment of the invention. Referring to FIG. 6, there is shown a MEMS detector module 600 comprising the deflectable members 301A and 301B, the substrate 501, the detectors 503A and 503B, the source 505, the IC 515, the spacer 601, and embedded devices and interconnects 805. The deflectable members 301A and 301B are as described with respect to FIG. 5. The substrate 501, the detectors 503A and 503B, the source 505, the IC 515, and the spacer 601 are as described with respect to FIGS. 3-6 of U.S. patent application Ser. No. 12/055,999, now U.S. Pat. No. 8,976, 046, the complete subject of which was previously incorporated herein by reference, above.

The embedded devices and interconnects 805 may comprise conducting and/or semiconducting materials embedded within the substrate 501 that may create discrete devices and/or device interconnects. For example, conductive ink may be utilized to create device interconnects. The embedded devices and interconnects 805 may enable proper biasing conditions for the detectors 503A and 503B and the source 505, and may also provide electrical interconnects to the IC 515.

In operation, air flow, which may result from the expulsion of air, for example, from a user's breath, may deflect or move the deflectable members 301A and 301B. The source 505 may generate a light signal that may reflect off of the deflectable members 301A and 301B. The members may be reflective to light in the frequency being utilized for sensing. In instances where there is no deflection, the reflected light signals received by the detectors 503A and 503B may be a maximum, and may be utilized to calibrate a MEMS detector system or module, at startup, or on a periodic basis. Additional details about calibration may be found, for example, in U.S. patent application Ser. No. 12/055,999, now U.S. Pat. No. 8,976,046, the complete subject of which was previously incorporated herein by reference, above. In instances when the deflectable members 301A and 301B may be fully deflected against the spacer 601, the light signal received by the detectors 503A and 503B may be zero, or a minimum level, to indicate maximum deflection. Additional details regarding this process are described further with respect to FIG. 9 of U.S. patent application Ser. No. 12/055,999, now U.S. Pat. No. 8,976,046, the complete subject of which was previously incorporated by reference, above.

The reflected light received by the detectors 503A and 503B may generate electrical signals that may be communicated to the IC 515 via the embedded devices and interconnects 805.

Figure 7:
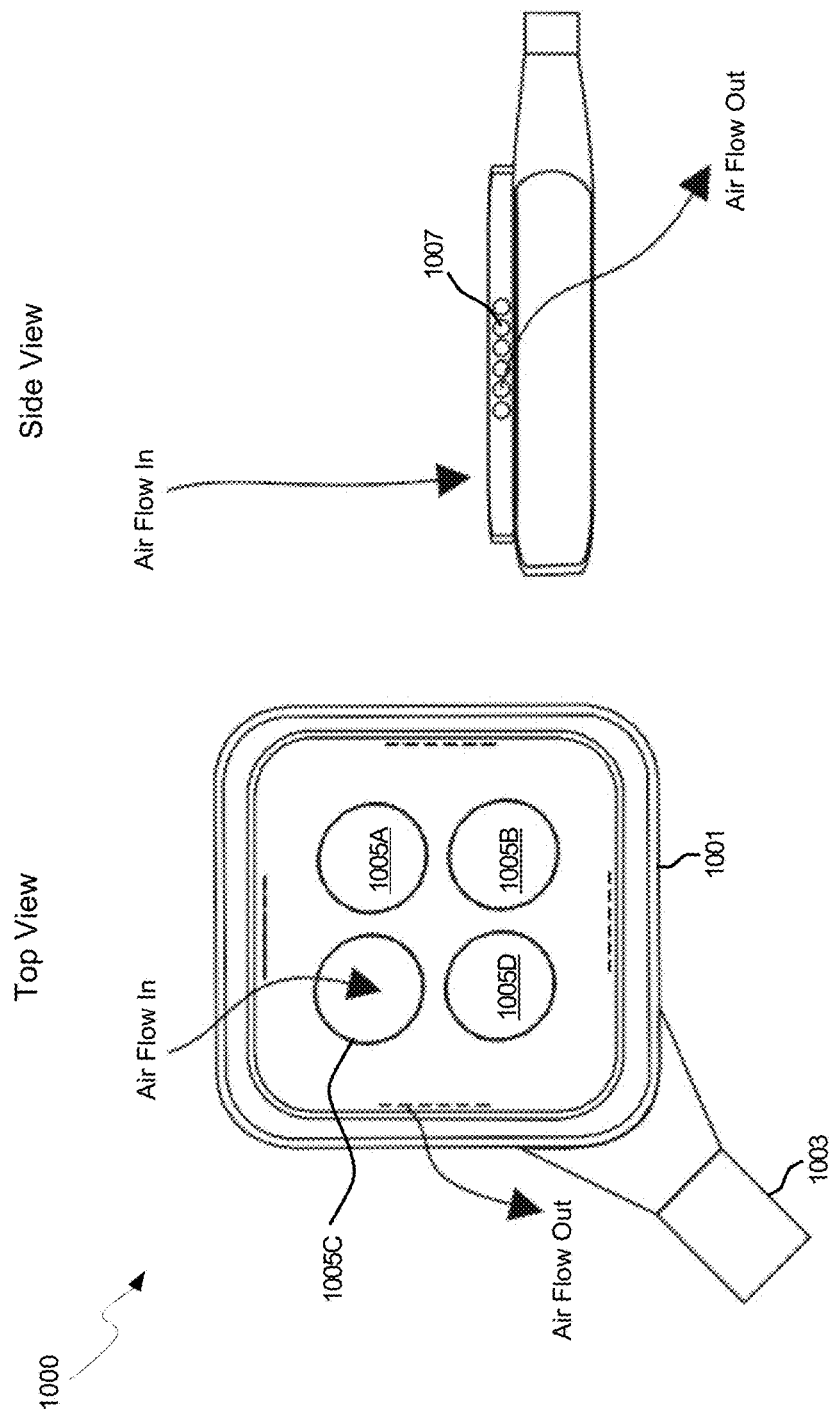
FIG. 7 is a block diagram of an exemplary air flow detector assembly, in accordance with an embodiment of the invention.

FIG. 7 is a block diagram of an exemplary air flow detector assembly, in accordance with an embodiment of the invention. Referring to FIG. 7, there is shown an air flow detector assembly 1000 which may comprise the MEMS detector assembly 600 within an enclosure 1001 mechanically coupled to a support member 1003 designed for user operation. The enclosure 1001 may comprise, for example four sets of exhaust holes 1007, and may also comprise four inlet holes 1005A-1005D that may align with the deflectable members 301A-301D. The exhaust holes 1007 may be aligned in such a manner as to prevent a user from blowing through the exhaust holes 1007 during normal operation.

In operation, air flow may enter in the inlets 1005A-1005D, follow the path within the enclosure 1001 as described with respect to FIG. 6, and then exit the enclosure 1001 through one or more of the exhaust holes 1007. In this manner, pressure vortices or pressure buildups, which may adversely affect detector signals, may be reduced or eliminated within the enclosure 1001.

In accordance with an embodiment of the invention, the detection of the movement caused by expulsion of human breath may occur without use of a channel. The detection of the movement caused by expulsion of human breath may be responsive to the expulsion of human breath into open space, which is then sensed.

The invention is not limited to the expulsion of breath. Accordingly, in various exemplary embodiments of the invention, the MEMS may be enabled to detect the expulsion of any type of fluid such as air, and the source of the fluid may be an animal, a machine and/or a device.

Certain embodiments of the invention may comprise a machine-readable storage having stored thereon, a computer program having at least one code section for processing signals that control a device using human breath, the at least one code section being executable by a machine for causing the machine to perform one or more of the steps described herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for interfacing a user device with an input device using human breath, the method comprising:

in a user device that generates a graphical user interface (GUI) for display to a user,
receiving one or more signals from a user input device operable to function as a human interface device (HID), wherein said one or more signals are generated from a plurality of sensor signals output by a corresponding plurality of flow sensors of said user input device in response to simultaneous detection, by each flow sensor of said plurality of flow sensors, of a corresponding portion of a flow of human breath expelled by the user and directly onto a deflectable member of said respective flow sensor, without use of a channel to guide said flow of human breath from said user to said deflectable members of said plurality of flow sensors of said input device;

determining whether the received one or more signals are compliant with an HID profile supported by the user device;

passing the received one or more signals to interface software for processing HID compliant signals, if it is determined that the received one or more signals are compliant with the HID profile;

passing the received one or more signals to software for performing breath user interface processing, if it is determined that the received one or more signals are not compliant with the HID profile; and displaying a first graphical object on said GUI of said user device at a location controlled by the user via said received one or more signals, by processing said received one or more signals to enable user navigation of the first graphical object to, and selection of, one or more other graphical objects of said GUI of said user device.

2. The method according to claim 1, wherein said user input device comprises a micro-electro-mechanical system (MEMS) detector.

3. The method according to claim 1, comprising formatting said received one or more signals into a HID profile or a device driver format.

4. The method according to claim 3, wherein said HID profile comprises one or more drivers and/or libraries that enable said interfacing with said GUI of said user device.

5. The method according to claim 4, wherein said one or more drivers enable one or more of initiation, establishment and/or termination of communication by said user device.

6. The method according to claim 1, wherein said interfacing with said user device is agnostic to any particular operating system (OS) platform on said user device.

7. The method according to claim 1, wherein said received one or more signals comprise digital signals.

8. The method according to claim 1, wherein said received one or more signals are compliant with a universal serial bus (USB) HID class.

9. The method according to claim 1, wherein said received one or more signals are compliant with a wireless protocol HID class.

10. The method according to claim 1, comprising interfacing with said user input device utilizing one or more applets.

11. The method according to claim 10, comprising interfacing with said GUI of said user device based on one or more outputs generated by said applets.

12. The method according to claim 1, wherein said user device comprises one or more of a personal computer (PC), a laptop, a notebook computer, a television (TV), game console, telemetric device a display device, and/or a handheld device.

13. The method according to claim 12, wherein said handheld device comprises one or more of a mobile telephone, a mobile multimedia player, navigation device and/or a remote controller.

14. The method according to claim 1, wherein said plurality of flow sensors and said user input device are disposed external to and without contact with the mouth of said user.

15. The method according to claim 1, wherein said plurality of flow sensors consists of four flow sensors.

16. A non-transitory computer-readable medium having stored thereon, a computer program having at least one code section for performing a method of interfacing a user device with an input device using breath, the at least one code section being executable by a machine for causing the machine to perform steps comprising:

generating a graphical user interface (GUI) for display to a user;

receiving one or more signals from a user input device operable to function as a human interface device (HID), wherein said one or more signals are generated from a plurality of sensor signals produced by respective flow sensors of said user input device in response to simultaneous detection, by each flow sensor, of a corresponding portion of a flow of human breath expelled by the user and directly onto a deflectable member of said respective flow sensor, without use of a channel to guide said flow of human breath from said user to said deflectable members of said plurality of flow sensors of said input device;

determining whether the received one or more signals are compliant with an HID profile supported by the user device;

passing the received one or more signals to interface software for processing HID compliant signals, if it is determined that the received one or more signals are compliant with the HID profile;

passing the received one or more signals to software for performing breath user interface processing, if it is determined that the received one or more signals are not compliant with the HID profile; and displaying a first graphical object on said GUI of said user device at a location controlled by the user via said received one or more signals, by processing said received one or more signals to enable user navigation of the first graphical object to, and selection of, one or more other graphical objects of said GUI of said user device.

17. The non-transitory computer-readable medium according to claim 16, wherein said user input device comprises a micro-electro-mechanical system (MEMS) detector.

18. The non-transitory computer-readable medium according to claim 16, wherein said at least one code section comprises code for formatting said received one or more signals into a HID profile or a device driver format.

19. The non-transitory computer-readable medium according to claim 18, wherein said HID profile comprises one or more drivers and/or libraries that enable said interfacing with said GUI of said user device.

20. The non-transitory computer-readable medium according to claim 19, wherein said one or more drivers enable one or more of initiation, establishment and/or termination of communication by said user device.

21. The non-transitory computer-readable medium according to claim 16, wherein said interfacing with said user device is agnostic to any particular operating system (OS) platform on said user device.

22. The non-transitory computer-readable medium according to claim 16, wherein said received one or more signals comprise digital signals.

23. The non-transitory computer-readable medium according to claim 16, wherein said received one or more signals are compliant with a universal serial bus (USB) HID class.

24. The non-transitory computer-readable medium according to claim 16, wherein said received one or more signals are compliant with a wireless protocol HID class.

25. The non-transitory computer-readable medium according to claim 16, wherein said at least one code section comprises code for interfacing with said user input device utilizing one or more applets.

26. The non-transitory computer-readable medium according to claim 25, wherein said at least one code section comprises code for interfacing with said GUI of said user device based on one or more outputs generated by said applets.

27. The non-transitory computer-readable medium according to claim 16, wherein said user device comprises one or more of a personal computer (PC), a laptop, a notebook computer, a television (TV), a display device, game console, telemetric device, and/or a handheld device.

28. The non-transitory computer-readable medium according to claim 27, wherein said handheld device comprises one or more of a mobile telephone, a mobile multimedia player, navigation device and/or a remote controller.

29. The non-transitory computer-readable medium according to claim 16, wherein said plurality of flow sensors and said user input device are disposed external to and without contact with the mouth of said user.

30. The non-transitory computer-readable medium according to claim 16, wherein said plurality of flow sensors consists of four flow sensors.

31. A system for interfacing a user device with an input device using human breath, the system comprising:
one or more processors that enable receipt at the user device, of one or more signals from a user input device operable to function as a human interface device (HID), wherein said one or more signals are generated from a plurality of sensor signals produced by respective flow sensors of said user input device in response to simultaneous detection, by each flow sensor, of a corresponding portion of a flow of human breath expelled by the user and directly onto a deflectable member of said respective flow sensor, without use of a channel to guide said flow of human breath from said user to said deflectable members of said plurality of flow sensors of said input device;
wherein said one or more processors enable determining whether the received one or more signals are compliant with an HID profile supported by the user device;
wherein said one or more processors enable passing the received one or more signals to interface software for processing HID compliant signals, if it is determined that the received one or more signals are compliant with the HID profile;
wherein said one or more processors enable passing the received one or more signals to software for performing breath user interface processing, if it is determined that the received one or more signals are not compliant with the HID profile; and
wherein said one or more processors enable display of a first graphical object on said GUI of said user device at a location controlled by the user via said received one or more signals, by processing said received one or more signals to enable user navigation of the first graphical object to, and selection of, one or more other graphical objects of said GUI of said user device.

32. The system according to claim 31, wherein said user input device comprises a micro-electro-mechanical system (MEMS) detector.

33. The system according to claim 31, wherein said one or more processors enable formatting of said received one or more signals into a HID profile or a device driver format.

34. The system according to claim 33, wherein said HID profile comprises one or more drivers and/or libraries that enable said interfacing with said GUI of said user device.

35. The system according to claim 34, wherein said one or more drivers enable one or more of initiation, establishment and/or termination of communication by said user device.

36. The system according to claim 31, wherein said interfacing with said user device is agnostic to any particular operating system (OS) platform on said user device.

37. The system according to claim 31, wherein said received one or more signals comprise digital signals.

38. The system according to claim 31, wherein said received one or more signals are compliant with a universal serial bus (USB) HID class.

39. The system according to claim 31, wherein said received one or more signals are compliant with a wireless protocol HID class.

40. The system according to claim 31, wherein said one or more processors enable interfacing with said user input device utilizing one or more applets.

41. The system according to claim 40, wherein said one or more processors enable interlacing with said GUI of said user device based on one or more outputs generated by said applets.

42. The system according to claim 31, wherein said user device comprises one or more of a personal computer (PC), a laptop, a notebook computer, a television (TV), game console, telemetric device, a display device, and/or a handheld device.

43. The system according to claim 42, wherein said handheld device comprises one or more of a mobile telephone, a mobile multimedia player, navigation device and/or a remote controller.

44. The system according to claim 31, wherein said plurality of flow sensors and said user input device are disposed external to and without contact with the mouth of said user.

45. The system according to claim 31, wherein said plurality of flow sensors consists of four flow sensors.

46. A method for interaction, the method comprising interfacing with a graphical user interface (GUI) of a user device via expulsion of air, wherein one or more signals from an input device for detecting said expelled air are representative of a change of location of impact of flow of the expelled air onto a plurality of independently deflectable members of said input device without use of a channel to guide said flow of said expelled air from said user to said deflectable members, and wherein the one or more signals are communicated to said user device utilizing a human interface device (HID) profile, said input device enabling the user to navigate a first graphical object to, and select one or more other graphical objects of, said GUI using said expelled air.

47. The method according to claim 46, wherein said HID profile is a Universal Serial Bus (USB) HID profile, and a source of said expulsion of air is human breath.

48. A non-transitory computer-readable medium having stored thereon, a computer program having at least one code section for interfacing with a graphical user interface (GUI) of a user device via expulsion of air, the at least one code section being executable by a machine for causing the machine to perform steps comprising:

implementing a human interface device (HID) profile operable to enable human interfacing with a user device via expulsion of air by enabling the user to navigate a first graphical object to, and select one or more other graphical objects of, a graphical user interface using said expelled air, wherein one or more signals from an input device for detecting said expelled air are representative of a change of location of impact of flow of the expelled air directly onto a plurality of independently deflectable members of said input device without use of a channel to guide said flow of said expelled air from said user to said deflectable members, and wherein the one or more signals are communicated to said user device according to said HID profile, said plurality of deflectable members corresponding to a plurality of flow sensors of said input device.

49. The non-transitory computer-readable medium according to claim 48, wherein said HID profile is a Universal Serial Bus (USB) HID profile, and a source of said expulsion of air is human breath.

50. A system for interaction, the system comprising one or more processors operable to interface with a graphical user interface of a user device via expulsion of air, wherein one or more signals from an input device for detecting said expelled air are representative of a change of location of impact of flow of the expelled air onto a plurality of independently deflectable members of said input device without use of a channel to guide said flow of said expelled air from said user to said deflectable members, and wherein the one or more signals are communicated to said user device utilizing a human interface device (HID) profile, said plurality of deflectable members corresponding to a plurality of flow sensors of said input device and enabling the user to navigate a first graphical object to, and select one or more other graphical objects of the GUI, using said expelled air.

51. The system according to claim 50, wherein said HID profile is a Universal Serial Bus (USB) HID profile, and a source of said expulsion of air is human breath.

* * * * *